(12) United States Patent
Züfle

(10) Patent No.: US 6,763,317 B2
(45) Date of Patent: Jul. 13, 2004

(54) SAFETY FEATURE FOR AN INJECTION MOLDING MACHINE

(75) Inventor: Michael Züfle, Wiedenzhausen (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/308,849

(22) Filed: Dec. 3, 2002

(65) Prior Publication Data

US 2003/0109953 A1 Jun. 12, 2003

(30) Foreign Application Priority Data

Dec. 6, 2001 (DE) .......................................... 101 59 893

(51) Int. Cl.⁷ .............................................. G06F 15/00
(52) U.S. Cl. ..................................... 702/152; 702/150
(58) Field of Search .............................. 702/94, 95, 97, 702/142, 145, 150, 152, 155, 158, 183, 184, 185; 425/136, 145, 150, 151, 162

(56) References Cited

U.S. PATENT DOCUMENTS

| 3,857,658 A | 12/1974 | Muzsnay | 425/145 |
| 5,800,750 A | 9/1998 | Laing et al. | 264/40.5 |
| 6,432,334 B1 * | 8/2002 | Keller | 264/40.5 |
| 6,520,761 B2 * | 2/2003 | Arai et al. | 425/136 |
| 2001/0022983 A1 | 9/2001 | Arai et al. | 425/151 |

FOREIGN PATENT DOCUMENTS

| DE | 42 19 687 | 5/1994 |
| DE | 196 12 018 | 9/1997 |
| DE | 199 02 429 | 12/2000 |
| EP | 158 031 | * 10/1985 |
| EP | 0 158 031 | 10/1985 |
| EP | 0 203 199 | 5/1986 |
| EP | 1 318 005 | * 6/2003 |
| JP | 01188316 | 7/1989 |
| JP | 05138705 | 6/1993 |
| JP | 05177683 | 7/1993 |

* cited by examiner

Primary Examiner—Michael Nghiem
(74) Attorney, Agent, or Firm—Henry M. Feiereisen

(57) ABSTRACT

In a method of safeguarding an injection molding machine against execution of a faulty operation, a movement state of a moveable component, e.g. a moveable mold mounting plate of an injection molding machine, is monitored as a drive for the component is activated. Upon detection of no movement or only a minimal movement of the component, the drive is deactivated by a controller.

4 Claims, 1 Drawing Sheet

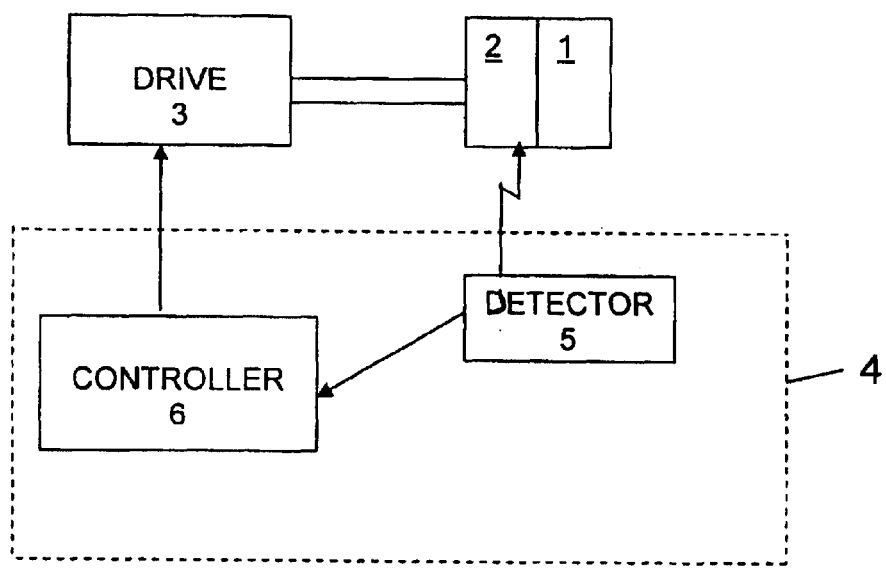
Figure

SAFETY FEATURE FOR AN INJECTION MOLDING MACHINE

CROSS-REFERENCES TO RELATED APPLICATIONS

This application claims the priority of German Patent Application, Serial No. 101 59 893.9, filed Dec. 6, 2001, pursuant to 35 U.S.C. 119(a)–(d), the disclosure of which is incorporated herein by reference.

BACKGROUND OF THE INVENTION

The present invention relates to a method for safeguarding an injection molding machine against a faulty operation.

Injection molding machines include at least two mold mounting plates, with one mold mounting plate fixedly anchored upon a machine bed and with the other mold mounting plate moveable relative thereto. The mold mounting plates carry respective half-molds which demarcate a cavity, when the half-molds are clamped together, to mold a plastic article. Opening and closing of the cavity involves a displacement of the moving mold mounting plate relative to the fixed mold mounting plate.

In the event an obstacle is encountered in its travel path, the movement of the moveable mold mounting plate may be inhibited and may lead to damage of the injection molding machine.

European Pat. No. EP 0 203 199 B1 describes a protection function which involves, on one hand, a reduction of the drive force for the moving mold mounting plate during travel, and, on the other hand, a check whether the mold mounting plate has traveled a predetermined distance. When the mold mounting plate has reached a first position, a time interval is measured. After elapse of this time interval, it is checked whether the mold mounting plate has reached a second position. If this is not the case, it is assumed that the mold mounting plate has hit an obstacle during its travel path so that the drive is deactivated and an alarm is triggered.

This conventional protection function suffers shortcomings because it is necessary to wait for the interval time to elapse so that blockage cannot immediately be recognized. As a consequence, it is conceivable that damage to the injection molding machine can occur during the initial interval time.

It would therefore be desirable and advantageous to provide an improved to obviate prior art shortcomings and to allow immediate detection of any blockage of a moveable component.

SUMMARY OF THE INVENTION

According to one aspect of the present invention, a method of safeguarding an injection molding machine against execution of a faulty operation, includes the steps of monitoring a movement state of a component of the injection molding machine as a drive for the component is activated, and deactivating the drive, when no movement or only a minimal movement of the component is detected.

The present invention resolves prior art problems by providing a safeguard function that allows immediate detection of a standstill in the absence of any change in position.

According to another feature of the present invention, the monitoring step may include a continuous monitoring of the speed of the component, wherein the drive is deactivated, when the speed reaches a predetermined minimum speed or approaches zero. Examples of suitable speed monitoring devices include sensors, such as induction sensors, moving coils, optical devices, or displacement pick-ups.

According to another feature of the present invention, the monitoring step may include a cyclical monitoring of a position of the component, wherein the drive is deactivated, when successive cycles establish no positional change or only a positional change below a predetermined minimum level. An example of a suitable monitoring device includes a displacement pick-up. When no change in position or only a minimal positional change of the component is registered, blockage is assumed and the drive is shut down.

According to another feature of the present invention, the monitoring step may include a position control system for continuously ascertaining an actual position value of the component as it moves, and comparing the actual position value with a desired position value from a displacement pick-up. During normal operation, the actual value trails the desired value within certain limits (lag error). When encountering an obstacle, the lag error increases, i.e. the difference between desired and actual values increases. Thus, the drive is deactivated, when the magnitude of a difference between actual position and desired position, i.e. the lag error, exceeds a predetermined value.

According to another feature of the present invention, a blockage may be detected also indirectly through provision of a drive control system for comparing cyclically a desired value of an operating parameter of the drive with a actual value of the operating parameter at any given time. Also in such a system, the actual value of a drive operating parameter trails the desired value, whereby in the event of a blockage, the difference between actual position and desired position exceeds a predetermined value, thereby deactivating the drive. A suitable operating parameter may be, e.g., the rotation speed of a motor, in particular an electromotor, whereby the rotation sensor is monitored.

Of course, the afore-stated measures may be combined by using a conventional displacement pick-up system for monitoring purposes and at the same time monitor the drive. The thus resultant redundancy is able to detect early on an error in the displacement pick-up system and/or in the drive monitoring system.

The method according to the present invention thus provides for immediate and direct error recognition and prevents therefore the need to wait for elapse of successive events (elapse of a monitoring time).

The method according to the present invention is applicable to monitor the movement of a moving mold mounting plate of an injection molding machine, e.g. electrically-operated as well as hydraulically-operated injection molding machines. Other examples of moving components that can be monitored include an ejection unit or an injection unit.

Implementation of the novel and inventive method according to the present invention may involve the use of sensors, e.g., a conventional measuring system, rotation sensor of a motor, additional speed sensors and the like, for generating signals that are transmitted to a controller for suitable processing in a manner as previously described for deactivating the drive and/or triggering of an alarm signal. The control unit may be a separate part or may be part of an already existing control system that has been suitably modified. Further details for implementation of a method according to the present invention are generally known to the artisan and thus are not described in detail for the sake of simplicity.

According to another aspect of the present invention, an injection molding machine, includes a fixed mold mounting plate; a moveable mold mounting plate; a drive for moving the moveable mounting plate relative to the fixed mold mounting plate; and a control system including a detector for monitoring a movement state of the moveable mold mounting plate during travel relative to the fixed mold mounting mold, and a controller operatively connected to the drive for deactivating the drive, when no movement or only a minimal movement of the moveable mold mounting plate is detected.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE is a schematic block diagram of a principal configuration of a method according to the present invention with reference to an injection molding machine.

DETAILED DESCRIPTION OF PREFERRED EMBODIMENTS

The depicted embodiment is to be understood as illustrative of the invention and not as limiting in any way.

Turning now to the FIGURE, there is shown a schematic block diagram of a principal configuration of a method according to the present invention with reference to an exemplified injection molding machine which includes a fixed mold mounting plate 1 and a moveable mold mounting plate 2 operated by a drive 3, e.g. an electromotor or a hydraulic drive, for displacement in the direction of the fixed molding plate 1. It will be appreciated by persons skilled in the art that the injection molding machine must contain much mechanical apparatus which does not appear in the foregoing FIGURE, e.g. half-molds, clamping unit, injection unit, feed unit. However, these apparatuses, like much other necessary apparatus, is not part of the invention, and has been omitted from the FIGURE for the sake of simplicity.

In order to detect a blockage of the moving mold mounting plate 2, the movement of the mold mounting plate 2 is continuously monitored by a detector 5 which is part of a control system 4 and generates an output signal representative of the movement state of the mold mounting plate 2 at any given time. The output signal from the detector 5 is continuously inputted into a controller 6 which forms another part of the control system 4 and processes the inputted signal. In the absence of any movement or only a minimal movement below a set threshold value by the mold mounting plate 2, the controller 6 immediately shuts down or deactivates the drive 3.

The detector 5 may be, e.g., a sensor, e.g. an induction sensor, moving coil, optical device, or a displacement pick-up, and may monitor the speed of the mold mounting plate 2 or may cyclically monitor the position of the mold mounting plate 2 at any given time. In the latter case, when successive cycles show an absence of a change in position, the control unit 5 interprets this as a blockage and shuts down the drive 3.

The control system 5 may also be constructed for position control for continuously comparing an actual position value at any given time with a desired position value at that time. Blockage is indicated when the difference between the actual position value and the desired position value exceeds a predetermined value.

The control system may also be configured to indirectly monitor the movement state of the mold mounting plate 2 by detecting an operating parameter of the drive 3, e.g. an actual rotation speed, and comparing the operating parameter with a desired value, e.g. a desired rotation speed.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of safeguarding an injection molding machine against execution of a faulty operation, comprising the steps of monitoring a movement state of a moveable component of the injection molding machine as a drive for the component is activated; and deactivating the drive, when no movement or only a minimal movement of the component is detected, wherein the monitoring step includes a position control system for ascertaining an instantaneous actual position value for comparison with an instantaneous desired position value of the moveable component, whereby during normal operation the actual position value differs from the desired position value by a difference, wherein the drive is deactivated, when the magnitude of the difference between the actual position value and the desired position value exceeds a predetermined limit.

2. The method of claim 1, wherein the moveable component is a mold mounting plate of the injection molding machine.

3. An injection molding machine, comprising:
a fixed mold mounting plate;
a moveable mold mounting plate;
a drive for moving the moveable mounting plate relative to the fixed mold mounting plate; and
a control system including a detector for monitoring a movement state of the moveable mold mounting plate during travel relative to the fixed mold mounting mold, and a controller operatively connected to the drive for deactivating the drive, when no movement or only a minimal movement of the moveable mold mounting plate is detected, wherein the control system is a position control system for ascertaining an instantaneous actual position value for comparison with an instantaneous desired position value of the moveable mold mounting plate, whereby during normal operation the actual position value differs from the desired position value by a difference, wherein the drive is deactivated, when the magnitude of the difference between the actual position value and the desired position value exceeds a predetermined limit.

4. A machine, comprising:
a moveable component;
a drive for moving the moveable component; and
a control system including a detector for monitoring a movement state of the moveable component, and a controller operatively connected to the drive for deactivating the drive, when no movement or only a minimal movement of the moveable component is detected, wherein the control system is a position control system for ascertaining an actual position value of the component at any given time and comparing the actual position with a desired position value of the component at that time, whereby during normal operation the actual position value differs from the desired position value by a difference, wherein the drive is deactivated, when the difference between the actual position value and the desired position value exceeds a predetermined limit.

* * * * *